United States Patent
Liu et al.

(10) Patent No.: US 7,527,426 B2
(45) Date of Patent: May 5, 2009

(54) PERFORMANCE TESTING APPARATUS FOR HEAT PIPES

(75) Inventors: Tay-Jian Liu, Tu-Cheng (TW);
Chih-Hsien Sun, Tu-Cheng (TW);
Chao-Nien Tung, Tu-Cheng (TW);
Chuen-Shu Hou, Tu-Cheng (TW)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 271 days.

(21) Appl. No.: 11/309,324

(22) Filed: Jul. 26, 2006

(65) Prior Publication Data

US 2007/0127550 A1    Jun. 7, 2007

(30) Foreign Application Priority Data

Dec. 2, 2005    (TW) ............... 94142533 A

(51) Int. Cl.
*G01N 25/20* (2006.01)
*G01K 17/06* (2006.01)
*G01K 1/14* (2006.01)

(52) U.S. Cl. .............. 374/29; 374/5; 374/147; 374/208; 374/43; 374/57

(58) Field of Classification Search .......... 374/147
See application file for complete search history.

(56) References Cited

U.S. PATENT DOCUMENTS

| 3,453,865 | A | * | 7/1969 | Reiter et al. ............... 374/33 |
| 4,067,237 | A | * | 1/1978 | Arcella ................. 73/204.23 |
| 5,248,198 | A | * | 9/1993 | Droege ...................... 374/7 |
| 5,355,683 | A | * | 10/1994 | Taylor ..................... 62/51.1 |
| 5,707,152 | A | * | 1/1998 | Krywitsky ............... 374/208 |
| 7,147,368 | B2 | * | 12/2006 | Chien ..................... 374/147 |
| 7,304,848 | B2 | * | 12/2007 | Chang .................... 361/701 |
| 2002/0053172 | A1 | * | 5/2002 | Castillejo ................. 52/36.2 |

FOREIGN PATENT DOCUMENTS

TW    M279851    11/2005

* cited by examiner

*Primary Examiner*—Gail Verbitsky
(74) *Attorney, Agent, or Firm*—Frank R. Niranjan

(57) ABSTRACT

A performance testing apparatus for a heat pipe includes an immovable portion having a cooling structure defined therein for cooling the heat pipe. A movable portion is capable of moving relative to the immovable portion. A receiving structure is defined between the immovable portion and the movable portion for receiving the heat pipe therein. A concavo-convex cooperating structure is defined in the immovable portion and the movable portion for ensuring the receiving structure being capable of precisely receiving the heat pipe. Temperature sensors are attached to the immovable portion and the movable portion to detect a temperature of the heat pipe. An enclosure encloses the immovable portion and the movable portions therein to provide a thermally stable environment for the heat pipe during test.

16 Claims, 8 Drawing Sheets

PERFORMANCE TESTING APPARATUS FOR HEAT PIPES

FIELD OF THE INVENTION

The present invention relates generally to testing apparatuses, and more particularly to a performance testing apparatus for heat pipes.

DESCRIPTION OF RELATED ART

It is well known that a heat pipe is generally a vacuum-sealed pipe. A porous wick structure is provided on an inner face of the pipe, and at least a phase changeable working media employed to carry heat is contained in the pipe. Generally, according to positions from which heat is input or output, a heat pipe has three sections, an evaporating section, a condensing section and an adiabatic section between the evaporating section and the condensing section.

In use, the heat pipe transfers heat from one place to another place mainly by exchanging heat through phase change of the working media. Generally, the working media is a liquid such as alcohol or water and so on. When the working media in the evaporating section of the heat pipe is heated up, it evaporates, and a pressure difference is thus produced between the evaporating section and the condensing section in the heat pipe. The resultant vapor with high enthalpy rushes to the condensing section and condenses there. Then the condensed liquid reflows to the evaporating section along the wick structure. This evaporating/condensing cycle continually transfers heat from the evaporating section to the condensing section. Due to the continual phase change of the working media, the evaporating section is kept at or near the same temperature as the condensing section of the heat pipe. Heat pipes are used widely owing to their great heat-transfer capability.

In order to ensure the effective working of the heat pipe, the heat pipe generally requires test before being used. The maximum heat transfer capacity (Qmax) and the temperature difference ($\Delta T$) between the evaporating section and the condensing section are two important parameters for evaluating performance of the heat pipe. When a predetermined quantity of heat is input into the heat pipe through the evaporating section thereof, thermal resistance (Rth) of the heat pipe can be obtained from $\Delta T$, and the performance of the heat pipe can be evaluated. The relationship between these parameters Qmax, Rth and $\Delta T$ is Rth=$\Delta T$/Qmax. When the input quantity of heat exceeds the maximum heat transfer capacity (Qmax), the heat cannot be timely transferred from the evaporating section to the condensing section, and the temperature of the evaporating section increases rapidly.

Conventionally, a method for testing the performance of a heat pipe is first to insert the evaporating section of the heat pipe into liquid at constant temperature; after a predetermined period of time, temperature of the heat pipe will become stable and then a temperature sensor such as a thermocouple, a resistance thermometer detector (RTD) or the like is used to measure $\Delta T$ between the liquid and the condensing section of the heat pipe to evaluate the performance of the heat pipe. However, Rth and Qmax can not be obtained from this test, and the performance of the heat pipe can not be reflected exactly by this test.

Referring to FIG. 6, a performance testing apparatus for heat pipes in accordance with related art is shown. The apparatus has a resistance wire 1 coiling round an evaporating section 2a of a heat pipe 2, and a water cooling sleeve 3 functioning as a heat sink and enclosing a condensing section 2b of the heat pipe 2. In use, electrical power controlled by a voltmeter and an ammeter flows through the resistance wire 1, whereby the resistance wire 1 heats the evaporating section 2a of the heat pipe 2. Simultaneously, by controlling flow rate and temperature of cooling liquid flowing through the cooling sleeve 3, the heat input at the evaporating section 2a can be removed from the heat pipe 2 by the cooling liquid at the condensing section 2b, whereby a stable operating temperature of adiabatic section 2c of the heat pipe 2 is obtained. Therefore, Qmax of the heat pipe 2 and $\Delta T$ between the evaporating section 2a and the condensing section 2b can be obtained by temperature sensors 4 at different positions of the heat pipe 2.

However, in the test, the related testing apparatus has drawbacks as follows: a) it is difficult to accurately determine lengths of the evaporating section 2a and the condensing section 2b which are important factors in determining the performance of the heat pipe 2; b) heat transference and temperature measurement may easily be affected by environmental conditions; c) it is difficult to achieve sufficiently intimate contact between the heat pipe and the heat source and between the heat pipe and the heat sink, which results in unsteady performance test results of the heat pipes. Furthermore, due to fussy and laborious assembly and disassembly in the test, the testing apparatus can be only used in the laboratory, and can not be used in the mass production of heat pipes.

In mass production of heat pipes, a large number of performance tests are needed, and the apparatus is used frequently over a long period of time; thus, the apparatuses not only requires good testing accuracy, but also requires easy and accurate assembly to the heat pipes to be tested. The testing apparatus affects the yield and cost of the heat pipes directly; thus testing accuracy, facility, speed, consistency, reproducibility and reliability need to be considered when choosing the testing apparatus. Therefore, the related testing apparatus needs to be improved in order to meet the demand for testing during mass production of heat pipes.

What is needed, therefore, is a high performance testing apparatus for heat pipes suitable for use in mass production of heat pipes.

SUMMARY OF THE INVENTION

A performance testing apparatus for a heat pipe in accordance with a preferred embodiment of the present invention comprises an immovable portion having a cooling structure defined therein for removing heat from a condensing section of the heat pipe requiring test. A movable portion is capable of moving relative to the immovable portion. A receiving structure is defined between the immovable portion and the movable portion for receiving the condensing section of the heat pipe therein. A concavo-convex cooperating structure is defined in the immovable portion and the movable portion for avoiding the movable portion from deviating from the immovable portion to ensure the receiving structure being capable of accurately receiving the heat pipe during the movement of the movable portion relative to the immovable portion. At least a temperature sensor is attached to at least one of the immovable portion and the movable portion for thermally contacting the heat pipe in the receiving structure for detecting temperature of the heat pipe. An enclosure encloses the immovable portion and the movable portions therein, and defines a space for movement of the movable portion relative to the immovable portion.

Other advantages and novel features will become more apparent from the following detailed description of preferred embodiments when taken in conjunction with the accompanying drawings, in which:

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Figure 1:
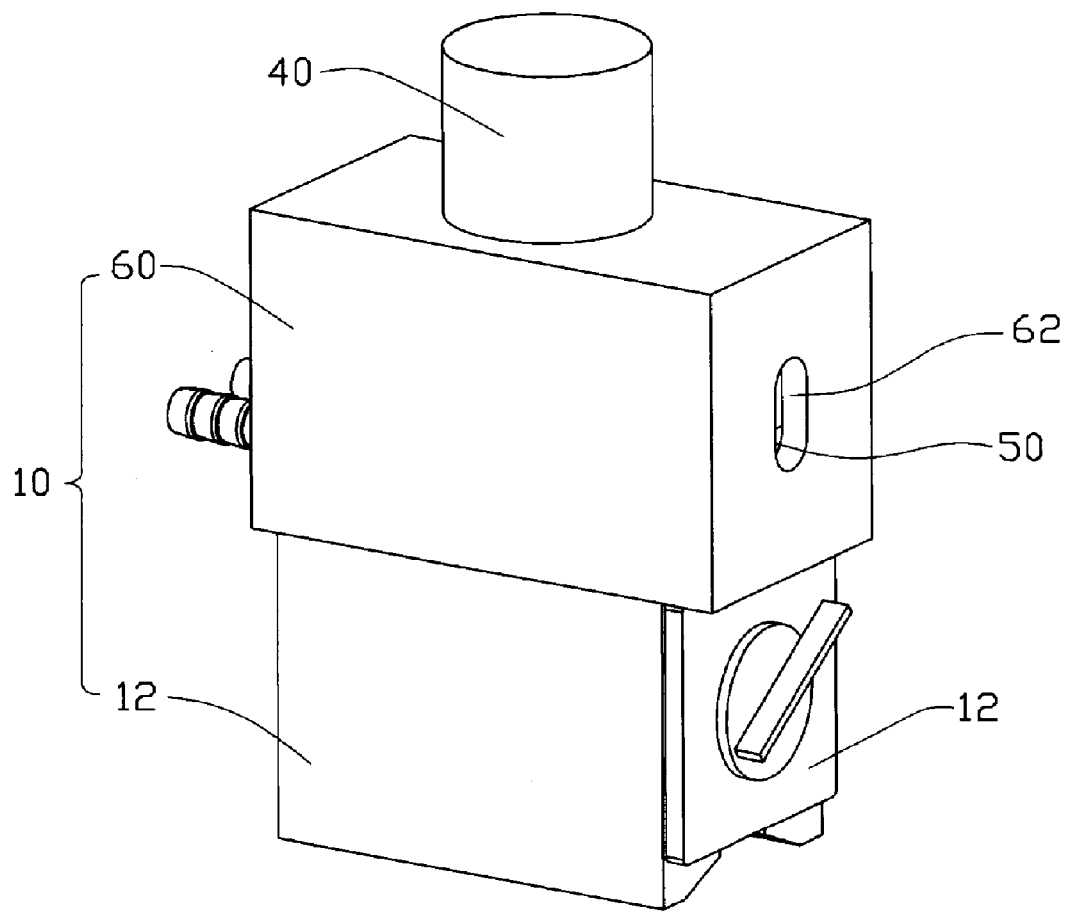
FIG. 1 is an assembled view of a performance testing apparatus for heat pipes in accordance with a preferred embodiment of the present invention.
Figure 2:
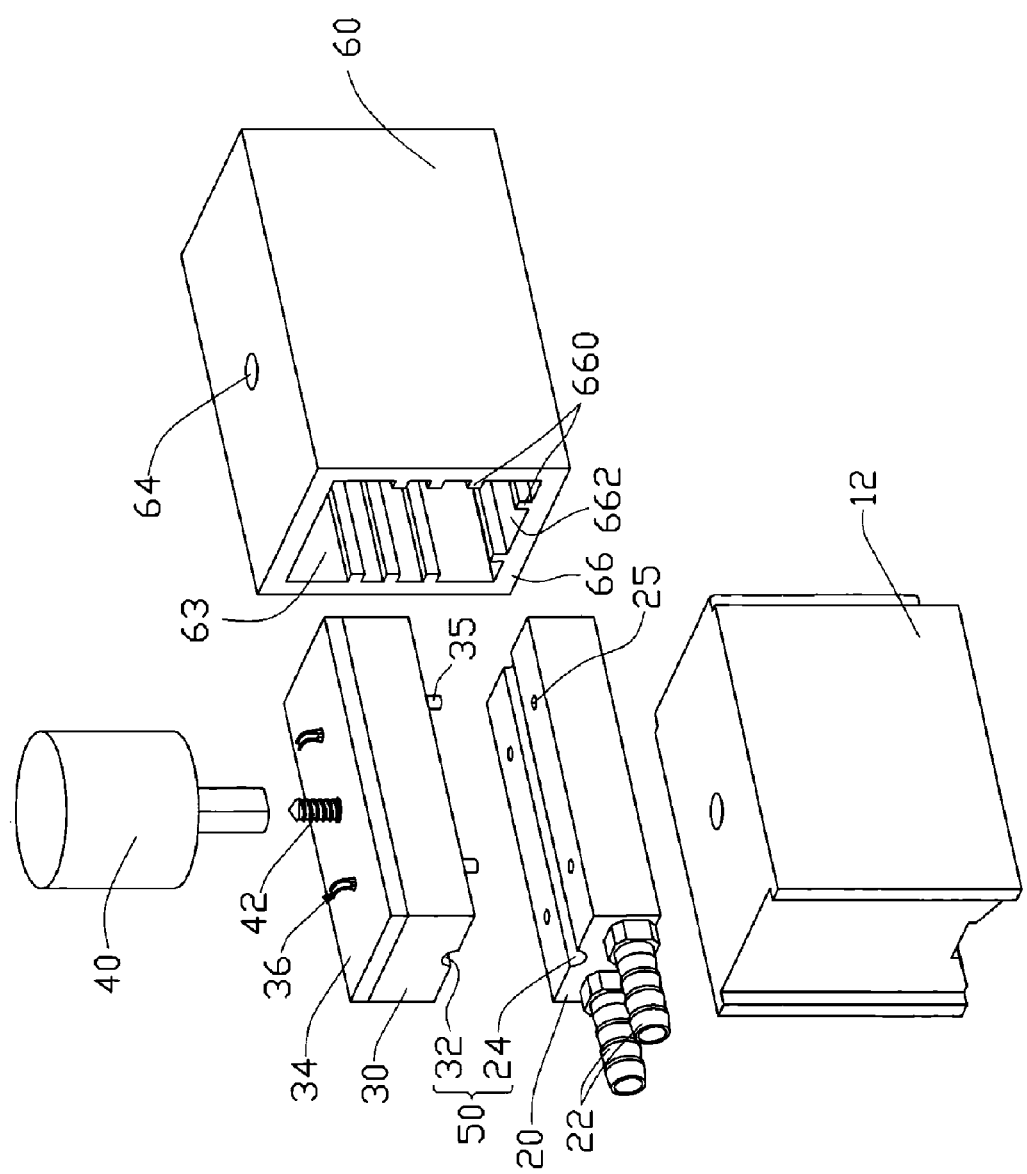
FIG. 2 is an exploded, isometric view of the testing apparatus of FIG. 1.
Figure 3A:
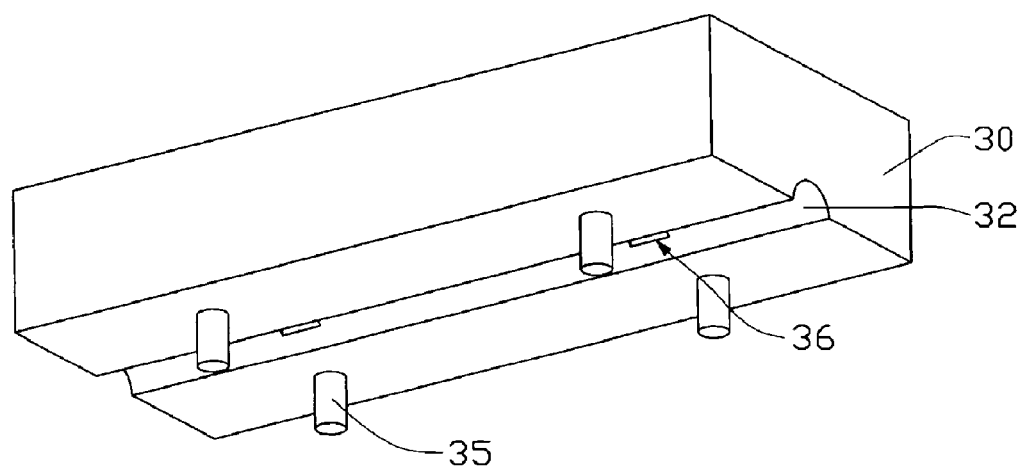
FIG. 3A shows a movable portion of the testing apparatus of FIG. 2, viewed from a different aspect.
Figure 3B:
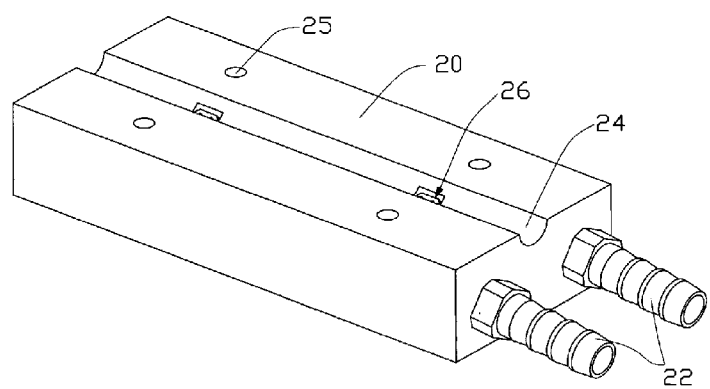
FIG. 3B shows an immovable portion of the testing apparatus of FIG. 2, viewed from a different aspect.

Referring to FIGS. 1-3B, a performance testing apparatus for heat pipes in accordance with a preferred embodiment of the present invention comprises an immovable portion 20 and a movable portion 30 movably mounted on the immovable portion 20.

The immovable portion 20 is made of metal having good heat conductivity. Cooling passageways (not shown) are defined in an inner portion of the immovable portion 20, to allow coolant to flow in the immovable portion 20. An inlet 22 and an outlet 22 communicate the passageways with a constant temperature coolant circulating device (not shown); therefore, the passageways, inlet 22, outlet 22 and the coolant circulating device corporately define a cooling system for the coolant circulating through the immovable portion 20 to remove heat from the heat pipe in test. The immovable portion 20 has a cooling groove 24 defined in a top face thereof, for receiving a condensing section of the heat pipe to be tested therein. Two temperature sensors 26 are inserted into the immovable portion 20 from a bottom thereof so as to position detecting portions (not labeled) of the sensors 26 in the cooling groove 24. The detecting portions of the sensors 26 are capable of automatically contacting the heat pipe in order to detect a temperature of the condensing section of the heat pipe.

The movable portion 30, corresponding to the cooling groove 24 of the immovable portion 20, has a positioning groove 32 defined therein, whereby a testing channel 50 is cooperatively defined by the cooling groove 24 and the positioning groove 32 when the movable portion 30 moves to reach the immovable portion 20. Thus, an intimate contact between the heat pipe and the movable and immovable portions 30, 20 defining the channel 50 can be realized, thereby reducing heat resistance between the heat pipe and the movable and immovable portions 30, 20. Two temperature sensors 36 are inserted into the movable portion 30 from a top thereof to reach a position wherein detecting portions (not labeled) of the sensors 36 are located in the positioning groove 32 and capable of automatically contacting the heat pipe to detect the temperature of the condensing section of the heat pipe.

The movable portion 30 has a plurality of cylindrical posts 35 extending downwardly integrally from a bottom face thereof towards the immovable portion 20. The cylindrical posts 35 are evenly located at two sides of the groove 32 of the movable portion 30. Corresponding to the posts 35 of the movable portion 30, the immovable portion 20 has a plurality of positioning holes 25 defined in a top face thereof. The posts 35 are slidably inserted into the corresponding holes 25. The posts 35 are entirely embedded in the holes 25 when the movable portion 30 moves to reach the immovable portion 20 where the bottom face of the movable portion 30 contacts the top face of the immovable portion 20. The posts 35 and the holes 25 concavo-convexly cooperate to avoid the movable portion 30 from deviating from the immovable portion 30 during test of the heat pipes, thereby ensuring the grooves 24, 32 of the immovable, movable portions 20, 30 to precisely align with each other. Accordingly, the channel 50 can be accurately formed for precisely receiving the heat pipe therein for test. Alternatively, the immovable portion 20 can have a plurality of posts while the movable portion 30 can have a plurality of holes corresponding to the posts.

The channel 50 as shown in the preferred embodiment has a circular cross section enabling it to receive the condensing section of the heat pipe having a correspondingly circular cross section. Alternatively, the channel 50 can have a rectangular cross section where the condensing section of the heat pipe also has a flat rectangular configuration.

In order to ensure that the heat pipe is in close contact with the movable and immovable portions 30, 20, a supporting frame 10 is used to retain the movable portion 30 together with the immovable portion 20. The immovable portion 20 is fixed on the supporting frame 10. A driving device 40 is installed on the supporting frame 10 to drive the movable portion 30 to make accurate linear movements relative to the immovable portion 20 along a vertical direction, thereby realizing the intimate contact between the heat pipe and the movable and immovable portions 30, 20; thus, heat resistance between the condensing section of the heat pipe and the movable and immovable portions 30, 20 can be minimized.

The supporting frame 10 comprises a seat 12 which according to the preferred embodiment is an electromagnetic holding chuck, by which the testing apparatus can be easily fixed at any desired position which is provided with a platform made of ferroalloy. In order to ensure that the immovable portion 20 and the movable portion 30 have good linear movement relative to each other, and keep the grooves 24, 32 of the immovable and movable portions 20, 30 in positions corresponding to each other, the supporting frame 10 further comprises a cuboidal enclosure 60 accommodating the immovable and movable portions 20, 30 therein. The enclosure 60 comprises a bottom wall 66 positioned on the seat 12 of the supporting frame 10 and three interconnecting sidewalls (not labeled) extending from the bottom wall 66. Two opposite sidewalls of the enclosure 60 each extend three parallel ribs 660 positioning the immovable portion 20 between the two opposite sidewalls, and the bottom wall 66 also extends two parallel spaced ribs 660 to support the immovable portion 20 thereon. These ribs 660 prevent the immovable portion 20 from directly contacting the opposite sidewalls and bottom wall 66 of the enclosure 60, to thereby construct a thermally stable environment for testing the heat pipes. A slot 662 is defined between the two ribs 660 of the bottom wall 66 for extension of wire of the temperature sensor 26 to connect with a monitoring computer. Corresponding to the channel 50 between the immovable and movable portions 20, 30, one of the sidewalls of the enclosure 60 other than the two opposite sidewalls defines an opening 62 for extension of the condensing section of heat pipe into the channel 50 via the opening 62. Corresponding to the inlet 22 and the outlet 22, the enclosure 60 defines an entrance 63 opposite to the opening 62, for the inlet 22 and outlet 22 extending therethrough. A space (not labeled) is left between the movable portion 30 and a ceiling of the enclosure 60 for movement of the movable portion 30. The driving device 40 is fixed to the ceiling of the enclosure 60. The ceiling of the enclosure 60 defines a through hole 64 for extension of a shaft (not labeled) of the driving device 40 therethrough to engage with a bolt 42 which is secured to a board 34 of the movable portion 30 in the enclosure 60. When the driving device 40 operates, the shaft rotates, the bolt 42 with the board 34 and the movable portion 30 move upwardly or downwardly away from or toward the immovable portion 20 in the enclosure 60.

The driving device 40 in this preferred embodiment is a step motor, although it can be easily apprehended by those skilled in the art that the driving device 40 can also be a pneumatic cylinder or a hydraulic cylinder. The shaft of the driving device 40 has a threaded end (not shown) threadedly engaging with the bolt 42 secured to a board 34 of the movable portion 30. The board 34 is fastened to the movable portion 30. When the shaft rotates, the bolt 42 with the board 34 and the movable portion 30 are moved upwardly or downwardly. Two through apertures (not labeled) are defined in the board 34 of the movable portion 30 for extension of wires (not labeled) of the temperature sensors 36 to connect with the monitoring computer. In use, the driving device 40 drives the movable portion 30 to make accurate linear movement relative to the immovable portion 20. For example, in the enclosure 60, the movable portion 30 is driven to depart a certain distance such as 5 millimeters from the immovable portion 20 to facilitate the condensing section of the heat pipe which needs to be tested to be inserted into the channel 50 or withdrawn from the channel 50 after the heat pipe has been tested. On the other hand, the movable portion 30 can be driven to move toward the immovable portion 20 to thereby realize an intimate contact between the condensing section of the heat pipe and the immovable and movable portions 20, 30 during which the test is performed. Accordingly, the requirement for the testing, i.e. accuracy, ease of use and speed can be realized by the testing apparatus in accordance with the present invention.

It can be understood that positions of the immovable portion 20 and the movable portion 30 can be exchanged, i.e., the movable portion 30 being positioned on the bottom wall 66 of the enclosure 60, and the immovable portion 20 being located on the movable portion 30. The driving device 40 is positioned to be adjacent to the immovable portion 20 and drives the immovable portion 20 move relative to the movable portion 30 in the enclosure 60. Alternatively, each of the immovable and movable portions 20, 30 has one driving device 40 installed thereon to move them toward/away from each other.

In use, the condensing section of the heat pipe is received in the groove 24 of the immovable portion 20 when the movable portion 30 is moved away from the immovable portion 20. Under drive of the driving device 40, in the enclosure 60, the movable portion 30 is moved to the immovable portion 20 with the posts 35 of the movable portion 30 being slidably moved in the holes 25 of the immovable portion 20 to reach the position wherein the grooves 24, 32 of the immovable and movable portions 20, 30 accurately constitute the channel 50. Thus, the condensing section of the heat pipe is tightly fitted in the channel 50. The sensors 26, 36 are in thermal connection with the condensing section of the heat pipe; therefore, the sensors 26, 36 work to accurately send detected temperatures of the condensing section of the heat pipe to the monitoring computer. Based on the temperatures obtained by the plurality of sensors 26, 36, an average temperature can be obtained by the monitoring computer very quickly; therefore, performance of the heat pipe can be very quickly decided.

Figure 4:
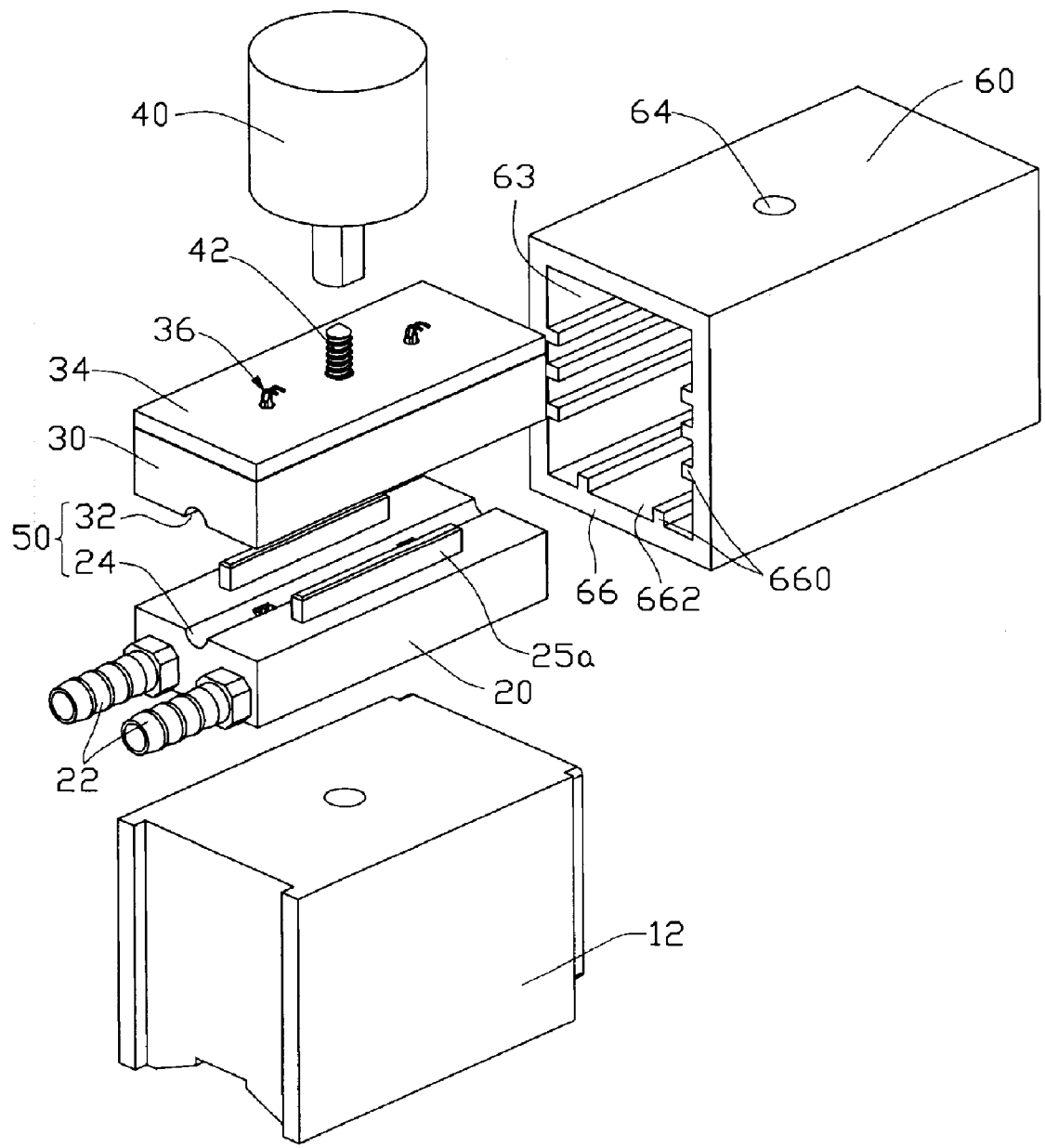
FIG. 4 is an exploded, isometric view of a performance testing apparatus in accordance with an alternative embodiment of the present invention.
Figure 5A:
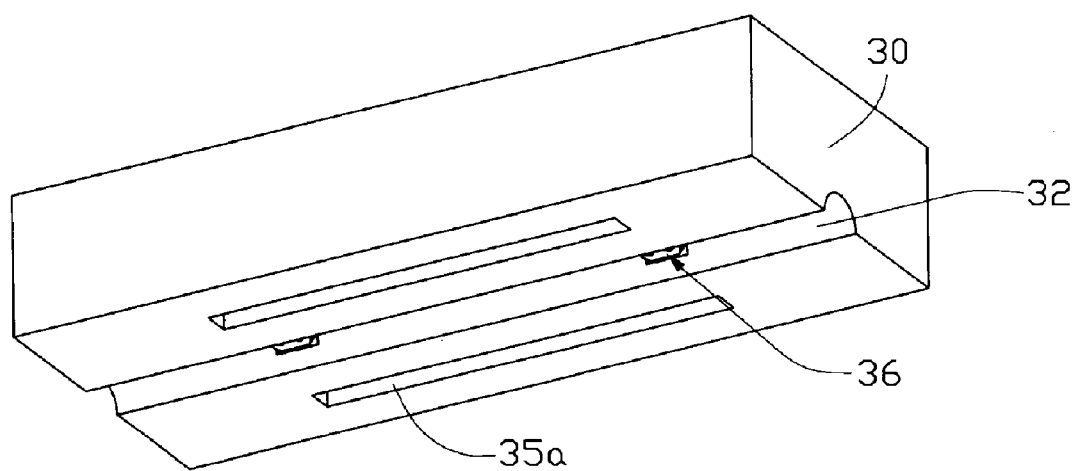
FIG. 5A shows a movable portion of the performance testing apparatus of FIG. 4, viewed from a different aspect.
Figure 5B:
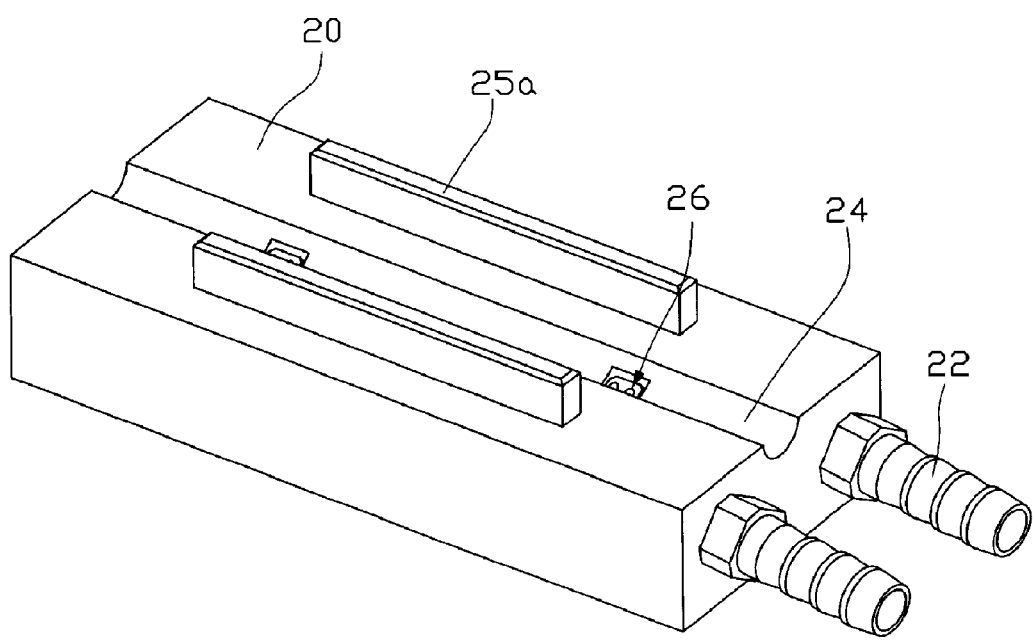
FIG. 5B shows an immovable portion of the testing apparatus of FIG. 4, viewed from a different aspect.
Figure 6:
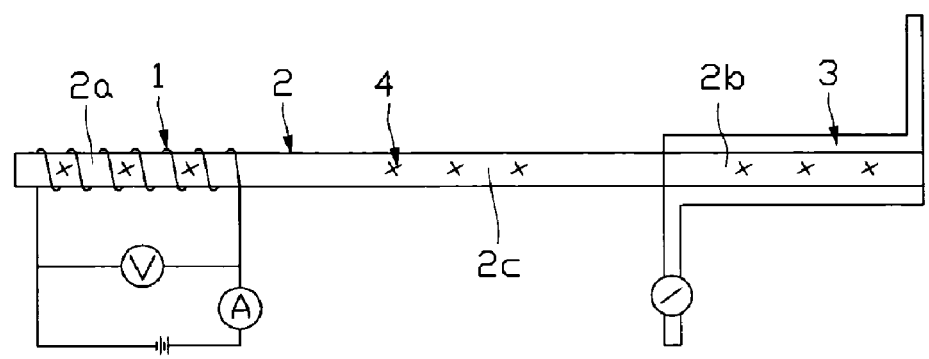
FIG. 6 is a performance testing apparatus for heat pipes in accordance with related art.

Referring to FIGS. 4-5B, a performance testing apparatus in accordance with an alternative embodiment of the present invention is shown. The apparatus in accordance with the alternative embodiment is similar to the previous preferred embodiment; the main difference therebetween is that the immovable portion 20 has two elongated boards 25a extending from a top face thereof and toward the movable portion 30. The two boards 25a are located at two opposite sides of the groove 24 of the immovable portion 20. The movable portion 30 defines two positioning slots 35a in a bottom face thereof, corresponding to the boards 25a. The boards 25a are capable of slidably moving in the corresponding slots 35a so that the movable portion 30 can have an accurate linear movement relative to the immovable portion 20. Alternatively, the movable portion 30 can extend boards while the immovable portion 20 can define slots receiving the boards.

Additionally, in the present invention, in order to lower cost of the testing apparatus, the movable portion 30, the board 34 and the enclosure 60 can be made from low-cost material such as PE (Polyethylene), ABS (Acrylonitrile Butadiene Styrene), PF(Phenol-Formaldehyde), PTFE (Polytetrafluoroethylene) and so on. The immovable portion 20 can be made from copper (Cu) or aluminum (Al). The immovable portion 20 can have silver (Ag) or nickel (Ni) plated on an inner face defining the groove 24 to prevent oxidization of the inner face.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A performance testing apparatus for a heat pipe comprising:
   an immovable portion having a cooling structure defined therein for cooling the heat pipe requiring test;
   a movable portion capable of moving relative to the immovable portion;
   a receiving structure being located between the immovable portion and the movable portion for receiving the heat pipe therein;
   a concavo-convex cooperating structure defined in the immovable portion and the movable portion for avoiding the movable portion from deviating from the immovable portion to ensure the receiving structure being capable of receiving the heat pipe precisely; and
   at least a temperature sensor being attached to at least one of the immovable portion and the movable portion for thermally contacting the heat pipe in the receiving structure to detect temperature of the heat pipe; and
   an enclosure enclosing the immovable portion and the movable portions therein, and defining a space for movement of the movable portion relative to the immovable portion.

2. The testing apparatus of claim 1, wherein the receiving structure is a channel defined between the immovable portion and the movable portion.

3. The testing apparatus of claim 2, wherein the channel is cooperatively defined by a cooling groove in a face of the immovable portion and a positioning groove in a face of the movable portion confronting the immovable portion.

4. The testing apparatus of claim 2, wherein the concavo-convex cooperating structure is a plurality of holes defined in the immovable portion and a plurality of posts extending from the movable portion toward the immovable portion, the posts being slidably received in corresponding holes.

5. The testing apparatus of claim 4, wherein the posts are evenly located at two opposite sides of the channel.

6. The testing apparatus of claim 2, wherein the concavo-convex cooperating structure is two slots defined in the movable portion and two boards extending from the immovable portion toward the movable portion, the boards being slidably received in corresponding slots.

7. The testing apparatus of claim 6, wherein the boards are located at two opposite sides of the channel.

8. The testing apparatus of claim 2, wherein the at least a temperature sensor has a detecting portion thereof exposed to the channel.

9. The testing apparatus of claim 1, wherein the enclosure has two opposite sidewalls thereof extending a plurality of ribs abutting against the immovable portion.

10. The testing apparatus of claim 1, wherein the enclosure has a bottom thereof extending a plurality of ribs supporting the immovable portion thereon.

11. The testing apparatus of claim 1, wherein the enclosure has a sidewall defining an opening corresponding to the receiving structure for extension the heat pipe into the receiving structure via the opening.

12. The testing apparatus of claim 1 further comprising a seat for positioning the testing apparatus at a required position, wherein the enclosure is positioned on the seat.

13. The testing apparatus of claim 1 further comprising a driving device mounted on a ceiling of the enclosure, the driving device connecting with the movable portion and capable of driving the movable portion to move away and towards the immovable portion.

14. The testing apparatus of claim 13, wherein the driving device connects with the movable portion via a bolt engaged with the movable portion, the driving device has a shaft extending through the ceiling of the enclosure and engaging with the bolt.

15. The testing apparatus of claim 1, wherein the cooling structure comprises a coolant passageway defined in the immovable portion and inlet and outlet adapted for fluidically communicating with a coolant circulating device with the coolant passageway.

16. The testing apparatus of claim 15, wherein the enclosure defines an entrance for extension of the inlet and outlet of the cooling structure of the immovable portion.

* * * * *

UNITED STATES PATENT AND TRADEMARK OFFICE
CERTIFICATE OF CORRECTION

PATENT NO. : 7,527,426 B2
APPLICATION NO. : 11/309324
DATED : May 5, 2009
INVENTOR(S) : Tay-Jian Liu et al.

It is certified that error appears in the above-identified patent and that said Letters Patent is hereby corrected as shown below:

Title Page
Please replace Section (75) regarding "Inventors" on the front page of the Patent with the following:

(75) Inventors: Tay-Jian Liu, Tu-Cheng (TW);
Chih-Hsien Sun, Tu-Cheng (TW);
Chao-Nien Tung, Tu-Cheng (TW);
Chuen-Shu Hou, Tu-Cheng (TW);
Jing-Hao Li, Shenzhen (CN)

Signed and Sealed this

Twenty-eighth Day of July, 2009

JOHN DOLL
*Acting Director of the United States Patent and Trademark Office*